Sept. 8, 1970 A. O. CHRISTENSEN 3,528,065

DOUBLE-RAIL RANDOM ACCESS MEMORY CIRCUIT FOR INTEGRATED CIRCUIT DEVICES

Filed May 5, 1969 2 Sheets-Sheet 1

INVENTOR.
ALTON O. CHRISTENSEN
BY
Mellin, Moore & Weissenberger
ATTORNEYS

INVENTOR
ALTON O. CHRISTENSEN
BY
Mellin, Moore & Weissenberger
ATTORNEYS

United States Patent Office 3,528,065
Patented Sept. 8, 1970

3,528,065
DOUBLE-RAIL RANDOM ACCESS MEMORY CIRCUIT FOR INTEGRATED CIRCUIT DEVICES

Alton O. Christensen, Houston, Tex., assignor to Shell Oil Company, New York, N.Y., a corporation of Delaware Filed May 5, 1969, Ser. No. 821,755
Int. Cl. G11c *11/40*
U.S. Cl. 340—173 12 Claims

ABSTRACT OF THE DISCLOSURE

A double-rail, fast-acting random access memory circuit is provided on an integrated circuit chip. The memory cell contains a complementary pair of cross-coupled memory elements and a pair of X address circuits operated by FARMOST decoders. The two complementary entry rails are addressed by a pair of Y address circuits also operated by FARMOST decoders. Operation of the circuit consists of transferring incremental charges into and out of the internal gate capacitances of the memory cell. Rapid operation is provided by precharging the entry rails, and by preconditioning the cell prior to a writing operation.

BACKGROUND OF THE INVENTION

Integrated circuit technology has made possible the economical manufacture of small silicon chips containing hundreds of circuits consisting solely of metal-oxide silicon field effect transistors (MOSFETs) and their interconnections. A MOSFET is a type of insulated-gate field effect transistor (IGFET), which is described in detail in the copending application Ser. No. 787,067, filed Dec. 26, 1968 and entitled Transistor Inverter Circuit.

To take advantage of the properties of all-IGFET single-chip circuits, new concepts in logic circuitry are required which obviate the necessity for external components such as resistors, capacitors, DC supplies, or magnetic memory elements. The present invention involves such a concept.

SUMMARY OF THE INVENTION

The memory elements of this invention are a pair of cross-connected discharge devices; more specifically, a pair of IGFETs whose drain electrodes are connected together and whose gate electrodes are connected to each other's source electrodes. Gating, and hence the state of the memory, is controlled by charges on the internal capacitances appearing between the gate-source connection points and ground.

An individual cell in a memory array can be randomly addressed by through internal X address circuits operated by a line common to all cells in a given column, and Y address circuits which connect the entry rails common to all cells in a given row to the read-write amplifier common to an entire array or chip.

The address circuits themselves are controlled by FARMOST (Fast Acting Ratioless Metal Oxide Silicon Transistor) NOR gate decoders which operate in accordance with principles described hereinbelow. The charges on all memory capacitances are refreshed during each cycle.

It is the object of the invention to provide an all-MOSFET random-access memory capable of being contained entirely within a single chip.

It is a further object of the invention to provide a memory of the type described in which the data is written and read double-rail for fast switching.

It is still another object of the invention to provide a memory of the type described in which operation is accomplished by the transfer of charges to and from the internal capacitances of the memory cell.

It is yet another object of the invention to obtain increased switching speeds through the use of entry rail precharging and cell preconditioning.

It is still another object of the invention to provide for random addressing of the cell through the use of FARMOST decoding.

DESCRIPTION OF THE PREFERRED EMBODIMENT

Figure 1:
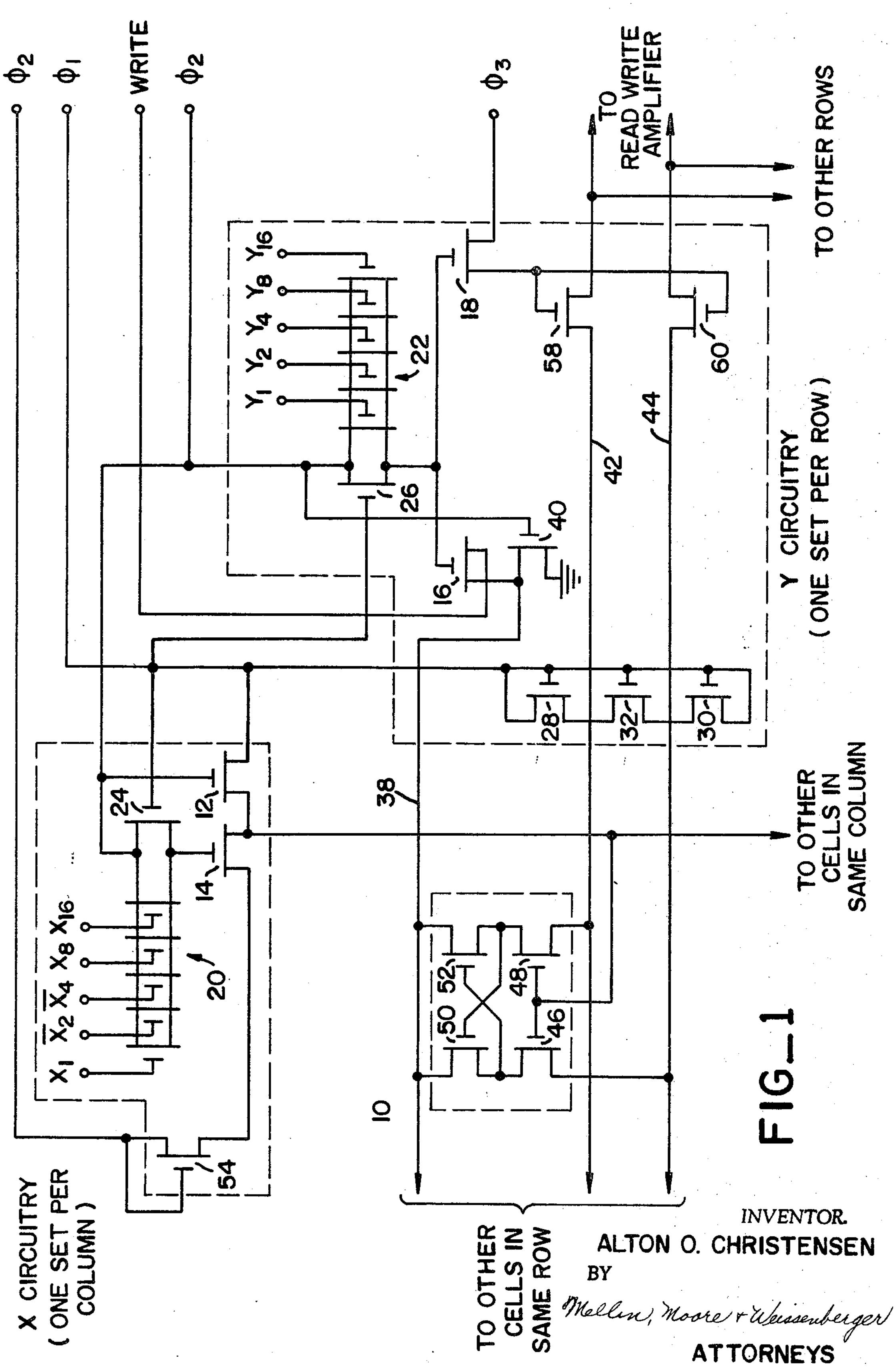
FIG. 1 is a circuit diagram of a double rail memory cell according to this invention, together with its associated addressing and sequencing circuitry.
Figure 2:
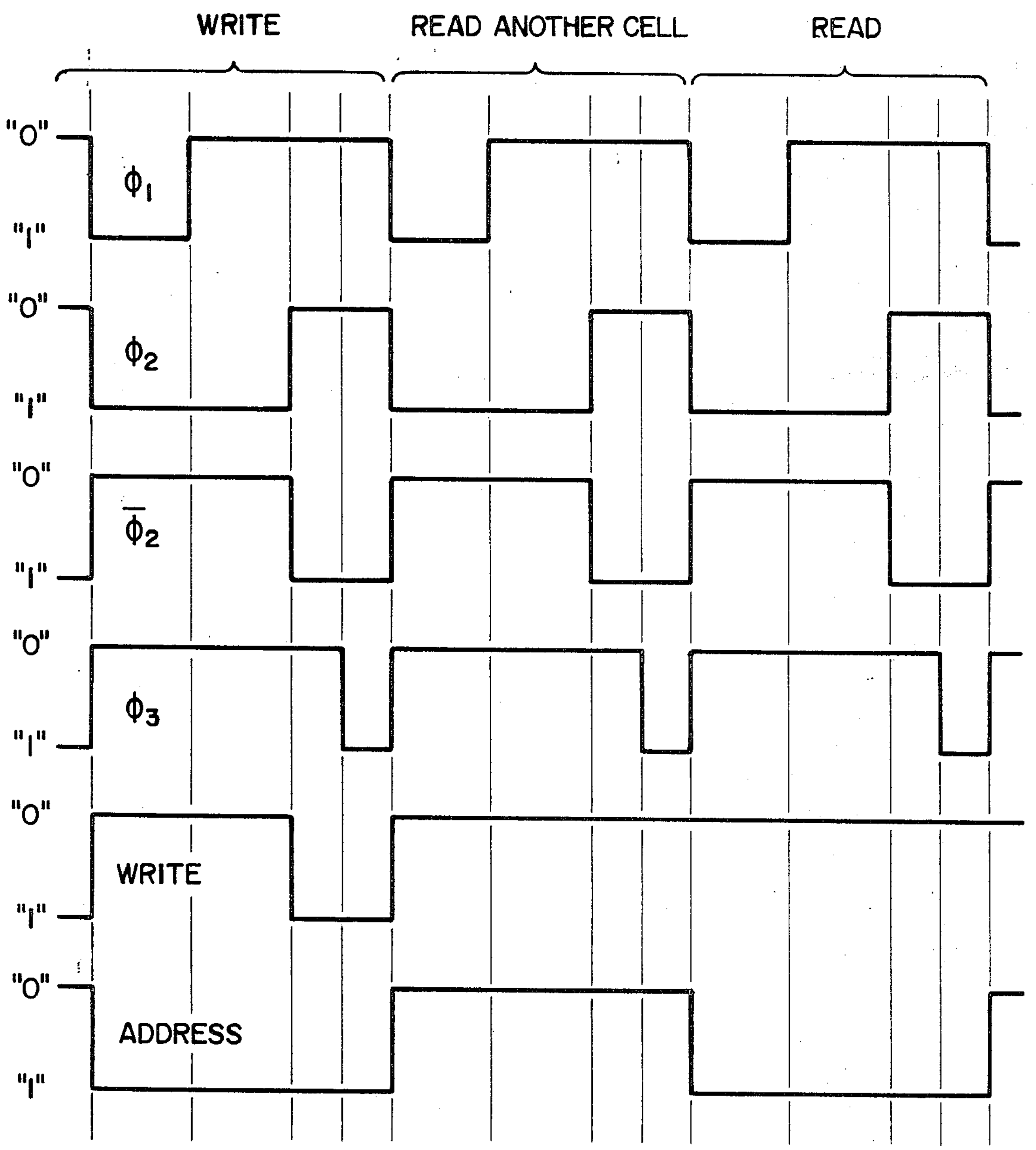
FIG. 2 is a timing diagram for the circuit of FIG. 1.

The structure and nature of the device shown in FIGS. 1 and 2 is best understood by following an operational sequence containing both a write operation and a read operation.

To begin with, a desired one of the memory cells 10 of a memory array is selected for addressing. In a typical 32×32 array of 1024 bits, each bit has a two-coordinate address represented by the intersection of a column (X address) and a row (Y address). In binary terms each of the 32X addresses can be represented by the presence of one or more of five binary address component inputs $X_1$, $X_2$, $X_4$, $X_8$, and $X_{16}$. For example, column No. 6 would be identified by $X_2$ and $X_4$ being at logic "1," the others at logic "0."

In each of the FARMOST NOR gate decoders 20 (one is required for each column of the array), there is a precharge gate 24 and five data gates representing the address components. Those address component inputs ($X_2$ and $X_4$ in the example chosen) which are at logic "1" in the correct address are inverted, so that the correct address will produce logic "0" in all five of the data gates of the FARMOST decoder 20.

As a result, a correct X address maintains gate 14 enabled after the precharge pulse $\phi_1$, while an incorrect X address blocks the gate 14 immediately upon the cessation of $\phi_2$ by virtue of the fact that at least one of the data gates of the decoder 20 would be enabled by an incorrect X address, and would allow the gate capacitance of gate 14 to discharge into the now grounded $\phi_2$.

The same manner of operation is present in the Y address decoder 22. For example, if the decoder 22 is in the seventh row, its Y address would be $Y_1 \cdot Y_2 \cdot Y_4$. Hence, component inputs $Y_1$, $Y_2$, and $Y_4$ are inverted to $\overline{Y}_1$, $\overline{Y}_2$, and $\overline{Y}_4$, to bring about an all "0" condition of decoder 22 when it is correctly addressed.

The sequence of operation of the circuit of FIG. 1 is as follows: At the beginning of clock pulse $\phi_1$ in the timing diagram of FIG. 2, clocks $\phi_1$ and $\phi_2$ are all at logic "1," and the $\overline{\phi_2}$, write and $\phi_3$ clocks are all at logic "0." Assuming that the cell 10 is being addressed, all $\overline{X}$ inputs and all $\overline{Y}$ inputs are at logic "0" and remain so throughout the cycle. The "1" condition of clock $\phi_2$ enables gate 12 directly and enables gates 14, 16 and 18 through the address decoders 20, 22 which are in turn enabled by the precharge clock $\phi_1$ at precharge gates 24, 26. The precharge clock $\phi_1$ also enables precharge gates 28, 30 and equalizing gate 32. The common line 38 is grounded at this time both due to the enabling of grounding gate 40 by $\phi_2$ and due to the enabling of writing gate 16 by $\phi_1$ and $\phi_2$ (the write clock being at ground at this time).

The enabling of precharge gates 28 and 30 impresses a logic "1" precharge on the input-output rails 42, 44. The enabling of the balancing gate 32 assures rapid equalization of the potentials in rails 42, 44 during the precharge period.

At the same time, the enabling of gate 12 allows precharge clock $\phi_1$ to enable the address gates 46, 48 of the cell 10. Assuming that the cell 10 is in a "1" memory condition, the gate of memory MOSFET 50 is in at logic "1" whereas the gate of the memory MOSFET 52 is below threshold. Consequently, memory MOSFET 50 is enabled but memory MOSFET 52 is blocked. The on-resistances of memory MOSFETs 50, 52 are low as compared to the on-resistances of cell address MOSFETs 46, 48, and a voltage divider action occurs between lines 38 and 44 through MOSFETs 50 and 56 which keeps the gate of MOSFET 52 below threshold.

Upon the cessation of the clock pulse $\phi_1$, the precharge gatss 24, 26, 28, 30 and the equalizing gate 32 all turn off. The cessation of $\phi_1$ also blocks cell address gates 46, 48 due to the fact that clock pulse $\phi_2$ still persists and enables gate 12. If the cell is being addressed, i.e. if all $\overline{X}$ and $\overline{Y}$ inputs are "0," gates 14, 16 and 18 will remain enabled because the charges on their gate capacitances cannot drain off. If the cell 10 were not being addressed, i.e. if any one or more of the $\overline{X}$ and $\overline{Y}$ inputs were "1," the enabled condition of gate 14, or of gates 16 and 18, would persist only until the cessation of the $\phi_2$ clock pulse, because their gate capacitances would then discharge to $\phi_2$ ground through the decoder 20 or 22.

In the interval between the cessation of $\phi_1$ and the cessation of $\phi_2$, the X address gates 46, 48 of the cell 10 are blocked, and consequently the gate of memory MOSFET 52 returns to full ground through the conducting memory MOSFET 30 (common line 38 being still grounded through gates 40 and 16) whereas the gate of memory MOSFET 50 remains at full "1" because both MOSFETs 52 and 48 are blocked.

When $\phi_2$ now ends, gates 14, 16 and 18 remain enabled as previously discussed, and $\overline{\phi_1}$ goes to "1" condition. If the cell 10 is being addressed, the $\overline{\phi_2}$ pulse enables isolation gate 54 and enables the cell address gate 46, 48 through isolation gate 54 and gate 14. (Due to the cessation of the $\phi_2$ pulse, gate 12 now isolates the cell address gates 46, 48 from the ground $\phi_1$.)

If no writing is to take place in the row of cell 10 during the cycle under consideration, the write clock remains at "0," and line 38 stays grounded through write gate 16 during the time that the grounding of $\phi_2$ blocks grounding gate 40.

If, on the other hand, a writing operation is to be performed in this cycle, the write pulse is transmitted to common line 38 through gate 16, grounding gate 40 being blocked during this time due to the grounding of $\phi_2$.

The simultaneous application of logic "1" from the write clock through gate 16 and memory MOSFET 50 on one hand, and from the line capacitance of the precharged rail 44 through cell address gate 46 on the other hand, drives the gates of memory MOSFET 52 toward threshold and beyond, if desired, to precondition the cell for rapid writing.

The actual writing is accomplished during $\phi_3$. The appearance of $\phi_3$ enables read-write gates 58, 60 and causes the data input to be impressed double-rail on the rails 42, 44. If the gate of memory MOSFET 52 has just previously gone above threshold, a voltage divider action occurs on both sides of the cell 10; otherwise it occurs only on the left side. Assuming that a "1" is being written, the data input is "1" on rail 42 and "0" on rail 44. The "1" thus created on rail 42 and the "1" existing in line 38 cause the gate of memory MOSFET 50 be maintained at a "1" level. On the other hand, the voltage divider action of MOSFETs 16, 50 and 46, 60 is such that the gate of memory MOSFET 52 is driven below threshold.

Upon the cessation of the $\phi_3$ pulse and the simultaneous cessation of the write pulse, the common line 38 is returned to ground level by the reappearance of the $\phi_2$ pulse which enables grounding gate 40, and the read-write gates 58, 60 are blocked. At this time, $\phi_1$ and $\phi_2$ begin anew and the cycle repeats.

Accidental erasure of the information in cell 10 by performing a write operation on another cell with the same Y address but a different X address is prevented by the fact that during this write operation, cell address gates 46, 48 are blocked. Hence, the gate of MOSFET 52 is driven only from the side of line 38, not from the rail 44, and this drive is insufficient to bring the gate of MOSFET 52 beyond threshold during the write pulse time. After the write pulse, ground is rapidly restored on the gate of MOSFET 52 as previously described.

When no write pulse is present during a given cycle, the $\phi_3$ pulse performs a reading operation instead of a writing operation. In that case, it will be seen that the condition immediatly preceding the occurrence of the $\phi_3$ pulse (assuming that the cell 10 contains a "1") is that rail 44 is grounded through MOSFETs 46 and 50, whereas rail 42 is maintained at a "1" level by its own line capacitance and the gate capacitance of MOSFET 50, inasmuch as the grounded gate of MOSFET 52 blocks the path between rail 42 and the grounded line 38.

The condition of rails 42, 44 is transmitted to the read amplifier (which may be, for example, of the type shown in the copending application Ser. No. 821,757, filed May 5, 1969, and entitled "Digital Differential Circuit Means") during $\phi_3$, and constitutes the output information of the memory array.

It will be noted that the information in each cell is refreshed during each cycle regardless of whether or not the cell is being addressed. Consequently, the clocks may be switched to a slow repetition rate (e.g. on the order of milliseconds instead of tens of nanoseconds) when the chip is not being addressed, in order to conserve power.

I claim:

1. A random-access semiconductor memory system, comprising:

(a) a plurality of memory cells arranged in an array addressable by a two-coordinate address system;

(b) common data input and readout means;

(c) each of said memory cells including a pair of memory semiconductors and a pair of first-coordinate address gates;

(d) a double-rail, selectively addressable second-coordinate line;

(e) each of said memory semiconductors being connected in series with one rail of said second-coordinate line, one of said first-coordinate address gates, and a common point;

(f) the control element of each of said memory semiconductors being connected to said series circuit of the opposite rail between the memory semiconductor and the first-coordinate address gate, and being capacitively coupled to ground by a control element coupling capacitance; and (g) data transfer means for selectively charging said control element coupling capacitances in accordance with data to be stored, and for selectively sensing the charge on said coupling capacitances.

2. The system of claim 1, in which said data transfer means include second-coordinate address gate means in each rail of said second-coordinate line to connect said line to said common data input and readout means.

3. The system of claim 2, in which reading is accomplished by sensing the potential difference between said rails of said second-coordinate line.

4. A random-access memory system for integrated circuits, comprising:

(a) a plurality of memory cells arranged on a chip in an array addressable by a two-coordinate address system;

(b) common double-rail data input and readout means;

(c) each of said memory cells including a pair of cross-coupled memory IGFET's and a pair of first-coordinate address IGFET's;

(d) double-rail second-coordinate line means;

(e) said memory and address IGFET's being connected to form two complementary series circuits connecting each rail of said second-coordinate line means through one of said first-coordinate address IGFET's and one of said memory IGFET's to a common point; and (f) means including a second-coordinate address IGFET associated with each of said second-coordinate line means for selectively connecting an addressed second-coordinate line means to said common data input and readout means.

5. The system of claim 4, in which the gate electrode of the memory IGFET in each said series circuit is connected to the other series circuit between its memory IGFET and its first-coordinate address gate IGFET, and is capacitively coupled to ground.

6. The system of claim 4, in which precharge means are provided for each rail of said second-coordinate line to charge the line-to-ground capacitance of each said rail to a predetermined level prior to each reading cycle.

7. The system of claim 4, further comprising a source of cyclically recurring clock pulses for sequencing the operations of said memory, and means to refresh the potential on each of said gate electrode coupling capacitances during each clock cycle.

8. The system of claim 4, in which said address IGFET's are controlled by the output of address decoder means formed as an IGFET NOR gate in which clock pulse means charge the gate-to-ground capacitances of IGFET means connected to the output of said address decoder means, and an address other than the correct address discharges the same upon cessation of said clock pulse means.

9. In a memory cell in which a memory condition is expressed by opposite logic states on the gate electrodes of a pair of cross-coupled IGFET's, the method of accelerating switching which includes the steps of:

(a) normally maintaining said gate electrodes in full opposite logic states; and (b) preconditioning said gate electrodes for a writing operation by driving at least one of said electrodes toward the logic state of the other in preparation for said writing operation.

10. In combination with a memory cell in which a memory condition is expressed by opposite logic states on the gate electrodes of a pair of cross-coupled IGFET's, a control system comprising:

(a) first-coordinate address gate means connected between said cross-coupled IGFET's and the rails of a double-rail data input-output line;

(b) second-coordinate address gate means connected between said rails and a pair of complementary read-write lines; and (c) normally grounded common line means connected to said cross-coupled IGFET's and selectively connectable to a source of write pulses.

11. The circuit of claim 10, further comprising pulse supply means connected to (i) precharge the line capacitances of both said rails to logic "1";

(ii) then partly discharging one of said line capacitances through an addressed memory cell;

(iii) then precondition said cell by charging the cross-coupled IGFET at logic "0" partially toward logic "1"; and (iv) lastly returning said partially charged gate to a full logic "0."

12. The circuit of claim 11, in which said preconditioning does not occur unless data is to be written on the row in which said cell is located, and said preconditioning charge is not sufficient to bring said gate at logic "0" above threshold unless said cell is also located in an addressed column, whereby said cell is connected to said precharged rails.

References Cited

UNITED STATES PATENTS

| | | | |
|---|---|---|---|
| 3,292,008 | 12/1966 | Rapp. | |
| 3,363,115 | 1/1968 | Stephenson | 307—291 |

TERRELL W. FEARS, Primary Examiner

U.S. Cl. X.R.

307—238, 279